United States Patent [19]

Gordon et al.

[11] 4,000,114

[45] Dec. 28, 1976

[54] FIRE RETARDANT POLYMER COMPOSITIONS WITH IMPROVED PHYSICAL PROPERTIES

[75] Inventors: Irving Gordon, Niagara Falls; James J. Duffy; Norman W. Dachs, both of Buffalo, all of N.Y.

[73] Assignee: Hooker Chemicals & Plastics Corporation, Niagara Falls, N.Y.

[22] Filed: Feb. 24, 1975

[21] Appl. No.: 552,681

[52] U.S. Cl. .................. 260/45.95 G; 260/45.7 R; 260/DIG. 24

[51] Int. Cl.² ...................... C08K 3/22; C08K 5/02

[58] Field of Search ............. 260/45.95 G, 45.7 R, 260/DIG. 24

[56] References Cited

UNITED STATES PATENTS

| | | | |
|---|---|---|---|
| 3,075,944 | 1/1963 | Wick et al. | 260/45.95 G X |
| 3,403,036 | 9/1968 | Hindersinn et al. | 260/45.7 R X |
| 3,624,024 | 11/1971 | Caldwell et al. | 260/45.7 R X |
| 3,632,544 | 1/1972 | Boyer | 260/45.8 A X |
| 3,723,383 | 3/1973 | Cyba | 260/DIG. 24 |

*Primary Examiner*—Donald E. Czaja
*Assistant Examiner*—S. M. Person
*Attorney, Agent, or Firm*—Peter F. Casella; James F. Mudd

[57] ABSTRACT

High impact thermoplastic polymers such as the styrenic based polymers, ABS and high impact polystyrene, are rendered fire retardant by the incorporation in the polymer of a mixture of a diadduct of hexahalocyclopentadiene and decabromodiphenyl oxide. The fire retardance of the compositions can be further enhanced by the incorporation therein of a metallic compound, particularly a compound of aluminum, zinc, arsenic, antimony or bismuth. A preferred metallic compound is antimony oxide.

15 Claims, No Drawings

FIRE RETARDANT POLYMER COMPOSITIONS WITH IMPROVED PHYSICAL PROPERTIES

BACKGROUND OF THE INVENTION

Styrenic based polymers are well known for their high impact strength. Typical of such polymers are those known by the name ABS polymers, which are graft copolymers of polybutadiene, styrene and acrylonitrile, and high impact polystyrene which has rubbery polymer particles dispersed in a matrix of polystyrene. There is increasing demand for such materials to be rendered fire retardant for use in applications such as television cabinets and other appliances. But many fire retardant compounds degrade the desirable properties of these polymers, particularly the impact strength. Accordingly, there is a need for a fire retardant system for high impact thermoplastic polymers which provides effective fire retardance and permits retention of the impact resistance of the polymer.

U.S. Pat. No. 3,403,036, describes polymer compositions containing as fire retarding agents, the diadducts of a halogenated cyclopentadiene and polyunsaturated cycloaliphatic compounds. Adducts disclosed by the patentees are the diadducts of 1,5-cyclooctadiene, dicyclopentadiene, cyclopentadiene and bicycloheptadiene.

British Pat. No. 1,305,834 describes polymer compositions containing as fire retarding agents, diadducts of a halogenated cyclopentadiene and furan. Similar adducts are disclosed in U.S. Pat. No. 3,632,544, which further discloses diadducts of halogenated cyclopentadienes and thiophene.

U.S. Pat. No. 3,075,944 describes polyolefin compositions containing chlorinated and brominated aromatic ether compounds such as pentabromo diphenyl ether (oxide).

The use of other brominated compounds has been suggested, but these cause undesirable results. For example, it is understood that excessive weight losses are encountered when hexabromocyclododecane is used. Also, hexabromocyclododecane drips extensively and can create corrosion problems. Octabromodiphenyl or decabromodiphenyl are subject to toxicological problems, and it is thought that the heat aging characteristics and weight losses encountered with these compounds at higher temperatures are undesirable. It has now been found that the use of the diadducts of halogenated cyclopentadienes and polyunsaturated cycloaliphatic compounds and polyunsaturated heterocyclic compounds in combination with decabromodiphenyl ether (oxide) not only provides excellent fire retardants for the high impact thermoplastic polymers, but also results in good retention of the impact strength of such polymers.

SUMMARY OF THE INVENTION

Fire retardant polymer compositions which also have superior physical properties such as impact strength are provided which comprise a high impact thermoplastic polymer and an effective fire retardant proportion of a diadduct of a halogenated cyclopentadiene and a polyunsaturated cyclic compound in combination with decabromodiphenyl oxide. The polyunsaturated cyclic compounds are preferably the polyunsaturated cycloaliphatic compounds and the polyunsaturated heterocyclic compounds.

DESCRIPTION OF THE EMBODIMENTS

The diadducts of halogenated cyclopentadienes useful in the fire retardant polymer compositions of the invention have the formula

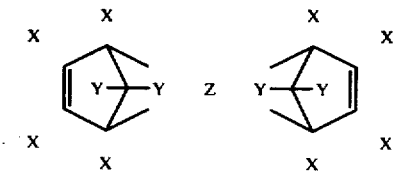

wherein X is selected from chlorine, bromine and fluorine, Y is selected from chlorine, bromine, fluorine, alkyl of 1 to 10 carbon atoms, alkyloxy wherein the alkyl group contains 1 to 10 carbon atoms, haloalkyl and haloalkyloxy wherein the alkyl groups contain 1 to 10 carbon atoms and halo is chloro, bromo or fluoro; Z is a tetravalent cyclic radical having at least 4 carbon atoms which may be substituted by alkyl groups of 1 to 6 carbon atoms, chlorine, bromine or fluorine. The alkyl and alkoxy radicals preferably have 1 to 6 carbon atoms. Z is preferably a tetravalent cyclic hydrocarbon of 5 to 18 carbon atoms or a tetravalent heterocyclic radical of 4 to 18 carbon atoms and preferably has 1 to 5 cyclic structures. When Z is a plurality of cyclic structures, they are fused, that is, share carbon atoms.

The foregoing diadducts are generally prepared by the Diels-Alder reaction of 1 mole of a polyunsaturated cyclic compound, such as a polyunsaturated cycloaliphatic compound or polyunsaturated heterocyclic compound, and 2 or more moles of a polyhalogenated cyclopentadiene of the formula

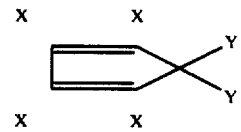

wherein X and Y have the same definition as previously stated. Illustrative of the polyhalogenated cyclopentadienes suitable for use in preparing the diadducts of the invention are hexachlorocyclopentadiene, 5,5-dimethoxytetrachlorocyclopentadiene, hexabromocyclopentadiene, 5,5-difluorotetrachlorocyclopentadiene, 5,5-dibromotetrachlorocyclopentadiene and 5,5-diethoxytetrachlorocyclopentadiene.

Suitable polyunsaturated cyclic compounds for use in preparing the diadducts of the invention include the cycloaliphatic compounds exemplified by, but not limited to methyl cyclopentadiene, cyclopentadiene, dicyclopentadiene, bicyclo(2.2.1)heptadiene, 1,5-cyclooctadiene, cyclodecadiene, cyclododecadiene, bicyclo(4.3.0)nona-3,7-diene and the 1,4-cyclohexadienes including 1,4-cyclohexadiene; alkyl-1,4-cyclohexadienes such as 1-methyl-1,4-cyclohexadiene, 1-ethyl-1,4-cyclohexadiene, 1-propyl-1,4-cyclohexadiene, 1,2-dimethyl-1,4-cyclohexadiene, 1,2-diethyl-1,4-cyclohexadiene, 1,2,3-trimethyl-1,4-cyclohexadiene, etc; halo-substituted 1,4-cyclohexadienes such as 1-chloro-1,4-cyclohexadiene, 1-bromo-1,4-cyclohexadiene, 1-fluoro-1,4-cyclohexadiene, 1,2-dichloro-1,4-cyclohexadiene, 1,2,3-trichloro-1,4-cyclohexadiene, 1,2-dibromo-1,4-cyclohexadiene, 1,2-difluoro-1,4-cyclohexadiene and the like.

Suitable polyunsaturated cyclic compounds also include heterocyclic compounds such as the furans and thiophenes. Suitable furan compounds have the formula

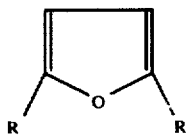

wherein R is individually selected from the group consisting of hydrogen and alkyl of 1 to 6 carbon atoms. Thus the furan compound can be furan itself, 1-methyl furan, 1-propyl furan, 1-heptyl furan, 1,4-dipropyl furan, 1-methyl-4-isobutyl furan and the like. The thiophene compounds have the formula

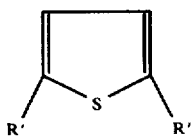

wherein R' is individually selected from the group consisting of hydrogen and alkyl of 1 to 6 carbon atoms. Thus, the thiophene compound can be thiophene itself, 1-methyl thiophene, 1-propylthiophene, 1-heptyl thiophene, 1,4-dipropyl thiophene, and the like.

Typical diadducts that can be used in the practice of the invention include 1,2,3,4,7,8,9,10,13,13,14,14-dodecachloro-1,4,4a,5,6-,6a,7,10,10a,11,12,12a-dodecahydro-1,4:7,10,-dimethanodibenzo[a,e]cyclooctene;

1,2,3,4,6,7,8,9,13,13,14,14-dodecachloro-1,4:5,10:6,9-trimethano-11H-benzo[b]-fluorene;

1,2,3,4,5,6,7,8,10,10,11,11-dodecachloro-1,4:5,8-dimethanofluorene;

1,2,3,4,5,6,7,8,12,12,13,13-dodecachloro-1,4:5,8:9,10-trimethano-anthracene;

1,2,3,4,5,6,7,8,11,11,12,12-dodecachloro-1,4,4a,5,8-,8a,9,9a,10,10a,decahydro-1,4,5,8-dimethanoanthracene;

1,2,3,4,6,7,8,9,10,10,11,11-dodecachloro-1,4,4a,5-,5a,6,9,9a,9b-octahydro-1,4:6,9-dimethanodibenzothiophene; and 1,2,3,4,6,7,8,9,10,10,11,11-dodecachloro-1,4,4a,5-,5a,6,9,9a,9b-octahydro-1,4:6,9-dimethanodibenzofuran.

The polymers useful in the practice of the invention include the homopolymers and copolymers of monomer compositions comprising styrene or substituted styrenes (substituted vinylbenzenes), such as styrene, vinyl toluene, chlorostyrenes, methyl styrenes such as alpha methyl styrene, p-methyl styrene, vinyl benzyl chloride, divinyl benzene, and the like. Particularly suitable polymers are those known in the art as ABS polymers, which are graft copolymers of polybutadiene, styrene and acrylonitrile, and those polymers known in the art as high impact polystyrenes. High impact polystyrene is a heterophase polymer with a rubbery polymer dispersed as small globules in a continuous matrix of polystyrene. The amount of rubber present by volume may be as low as 10 to 15 percent in medium impact grades and range as high as 40 percent in extra high impact types. The rubbery polymer used with the polystyrene is usually an elastomer with residual unsaturation, for instance, polybutadiene or a styrene-butadiene rubber. These toughened grades of polystyrene can be made by mechanical mixing of the rubber and the polystyrene on a two-roll mill or extruder. Common manufacturing techniques involve solution-graft polymerization processes although some special grades are made by blending polybutadiene latex or mechanical mixing with the polystyrene which can be made by processes of mass, suspension, solution, ionic or emulsion polymerization. The graft polymerization process starts with dissolving the rubber in styrene monomer, the rubber solution is then fed to the polymerization vessels.

The polymers of the invention can be in various physical forms, such as shaped articles, for example, molding, sheets, rods and the like; fibers, coatings, films and fabrics, and the like.

The combination of the halogenated diadducts of the invention and decabromodiphenyl oxide are incorporated in the polymeric materials in an effective fire retardant proportion. Generally, the combination of halogenated components are incorporated in the amount of about 2 to about 50 percent by weight of the polymeric composition and desirably from about 5 to about 40 percent by weight of the polymer composition and preferably from about 10 to about 35 percent by weight of the polymer composition. Within the mixture of halogen-containing components the proportion of diadduct is in the range of about 10 to about 90 weight percent of the mixture of halogenated components, preferably in the range of about 20 about 80 weight percent of the mixture of halogenated components.

Further improvement in the fire retardance of the polymer compositions can be provided by incorporating metallic compounds of metals such as antimony, arsenic, bismuth, aluminum and zinc. Hydrated aluninas are useful aluminum compounds. Zinc borate is a useful zinc compound. Animony oxide is the preferred antimony compound although many antimony compounds are suitable. Such compounds include the sulfides of antimony, alkali metal antimonite salts, antimony salts of organic acids and their pentavalent derivatives such as those disclosed in U.S. Pat. No. 2,996,528, and esters of antimonous acids and their pentavalent derivatives such as disclosed in U.S. Pat. No. 2,993,928. Still other suitable organic antimony compounds are the acyclic antimonites such as trimethylol propane antimonite, pentaerythritol antimonite and glycerol antimonite. The corresponding arsenic and bismuth compounds can also be employed, in particular the oxides or arsenic and bismuth. The metallic compounds are generally employed in the polymer compositions in the proportion of about 1 to about 30 weight percent of the polymer composition, preferably about 2 to 25 weight percent of the polymer composition.

The components comprising the compositions of the instant invention can be mixed by any one of several methods. The additives can be introduced into the polymer while the latter is dissolved in a suitable solvent. This procedure is especially useful when it is desired to mix the additives during the polymer manufacturing process. When the polymer is subsequently recovered from the solvent, the additives are intimately mixed with the polymer. Usually the additives are mixed with the polymer in the molten state at temperatures that can range from the melting point to the decomposition temperature of the polymer, e.g., from 70° to 600° C. Alternatively, the additives and polymer are dry blended in the finely divided state so that an intimate mixture is obtained upon subsequent molding or extrusion.

The following examples are intended to illustrate the invention, but are not intended to limit the scope of the invention. In these examples, as well as in the specification and claims, parts and percentages are by weight and temperatures are given in degrees centigrade unless otherwise specified.

EXAMPLES

Formulations were prepared by melt blending fire retardant additive compounds and either an ABS polymer or a high impact polystyrene on a two roll mill, followed by injection molding the mixed formulations, in the proportions shown in Tables 1 to 4. The properties of each molded specimen was determined and the values are also shown in Tables 1 to 4.

TABLE 1

| Formulation (Parts by Weight) | A | B | C | D | E | F | G | H | I | J | K |
|---|---|---|---|---|---|---|---|---|---|---|---|
| ABS Polymer (Blendex 101) | 100 | 80 | 80 | 80 | 80 | 80 | 80 | 80 | 80 | 80 | 80 |
| Antimony Trioxide | — | 5 | 5 | 5 | 5 | 5 | 5 | 5 | 3 | 3 | 3 |
| Diadduct of hexachlorocyclopentadiene and furan | — | 15 | — | 12 | 10 | 7.5 | 5 | 3 | 11 | 6 | 4 |
| Decabromodiphenyl oxide | — | — | 15 | 3 | 5 | 7.5 | 10 | 12 | 6 | 11 | 13 |
| Oxygen Index | 19 | 24.5 | 25.5 | 26±1 | 27±1 | 27.5 | 27±1 | 27±1 | 26±1 | 27±1 | 26±1 |
| ASTM D-635 | B | SE | SE | SE | SE | SE | SE | SE | SE | SE | SE |
| UL-94 1/8 inch specimen | — | V-1 | V-2 | V-0 | V-0 | V-0 | V-0 | V-0 | V-0 | V-0 | V-0 |
| UL-94 1/16 inch specimen | — | NA | NA | NA | NA | NA | NA | NA | NA | NA | NA |
| Izod Impact Strength foot pounds/inch notch | 8.6 | 3.3 | 2.8 | 4.4 | 4.6 | 7.4 | 4.2 | 4.0 | 4.5 | 4.3 | 4.0 |
| Heat Distortion (264 psi)° C | 69 | 70 | 69 | 67 | 68 | 67 | 67 | 68 | 69 | 68 | 68 |
| (66 psi)° C | 83 | 84 | 83 | 83 | 83 | 84 | 83 | 85 | 85 | 84 | 84 |
| Tensile Strength at Yield | 5431 | 5034 | 5397 | 4988 | 5046 | 5136 | 5158 | 5199 | 5056 | 5128 | 5189 |
| Tensile Strength at Break | 4056 | 3950 | 4150 | 3819 | 3819 | 3874 | 3949 | 3819 | 3814 | 3796 | 3904 |
| Flexural Strength, psi | 8656 | 8532 | 8859 | 8034 | 7952 | 8052 | 8257 | 8357 | 8191 | 8129 | 8441 |
| Flexural Modulus × 10$^5$ | 2.71 | 2.94 | 2.93 | 2.54 | 2.50 | 2.53 | 2.64 | 2.59 | 2.57 | 2.55 | 2.70 |

SE = Self Extinguishing
NA = Not Acceptable
B = BUrning

TABLE 2

| Formulation (Parts by Weight) | A | B | C | D | E | F | G |
|---|---|---|---|---|---|---|---|
| ABS Polymer (Blendex 101) | 100 | 80 | 80 | 80 | 80 | 80 | 80 |
| Antimony Trioxide | — | 5 | 5 | 5 | 5 | 5 | 5 |
| Diadduct of hexachlorocycylopentadiene and 1,5-cyclooctadiene | — | 15 | — | 10 | 7.5 | 5 | 3 |
| Decabromodiphenyl oxide | — | — | 15 | 5 | 7.5 | 10 | 12 |
| Oxygen Index | 19 | 24.5 | 25.5 | 26±1 | 26±1 | 26±1 | 26±1 |
| ASTM D-635 | B | SE | SE | SE | SE | SE | SE |
| UL-94 1/8 inch specimen | NA | NA | V-2 | NA | V-0 | V-0 | V-0 |
| UL-94 1/16 inch specimen | NA | NA | NA | NA | NA | NA | NA |
| Notched Izod Strength Foot pounds/inch notch | 8.6 | 1.1 | 2.8 | 2.1 | 2.5 | 2.7 | 2.9 |
| Heat Distortion (264 psi)° C | 69 | 71 | 69 | 69 | 68 | 70 | 70 |
| (66 psi)° C | 83 | 87 | 83 | 86 | 84 | 85 | 84 |
| Tensile Strength at Yield | 5431 | 5425 | 5397 | 5367 | 5400 | 5338 | 5311 |
| Tensile Strength at Break | 4056 | 4223 | 4150 | 3959 | 4015 | 3982 | 3991 |
| Flexural Strength, psi | 8656 | 9097 | 8857 | 8610 | 8627 | 8512 | 8492 |
| Flexural Modulus × 10$^5$ | 2.71 | 2.14 | 2.93 | 2.82 | 2.75 | 2.72 | 2.70 |

TABLE 3

| Formulation (Parts by Weight) | A | B | C | D | E | F | G | H | I | J |
|---|---|---|---|---|---|---|---|---|---|---|
| High Impact Polystyrene (Styron 492) | 100 | 80 | 80 | 80 | 80 | 80 | 80 | 80 | 80 | 80 |
| Antimony Trioxide | — | 5 | 5 | 5 | 5 | 5 | 5 | 5 | 3 | 3 |
| Diadduct of hexachlorocyclopentadiene and furan | — | 15 | — | 12 | 10 | 7.5 | 5 | 3 | 11 | 6 |
| Decabromodiphenyl oxide | — | — | 15 | 3 | 5 | 7.5 | 10 | 12 | 6 | 11 |
| Oxygen Index | 17.6 | 26 | 28 | 26 | 28 | 30 | 27 | 28 | 26 | 24 |
| ASTM D-635 | B | SE | SE | SE | SE | SE | SE | SE | SE | SE |
| UL-94 1/8 inch specimen | NA | V-1 | V-0 | V-1 | V-1 | V-1 | V-1 | V-0 | V-0 | V-0 |
| UL-94 1/16 inch specimen | NA | V-2 | V-0 | V-2 | V-1 | V-2 | V-2 | V-2 | V-2 | V-2 |
| Izod Impact Strength Foot pounds/inch notch | 1.7 | 0.8 | 1.1 | 1.3 | 1.3 | 1.3 | 1.3 | 1.3 | 1.3 | 1.2 |
| Heat Deflection (264 psi)° C | 75 | 71 | 76 | 74 | 74 | 74 | 73 | 74 | 74 | 73 |
| (66 psi)° C | 86 | 84 | 85 | 83 | 83 | 84 | 83 | 85 | 83 | 84 |
| Tensile Strength at Yield | 4425 | — | — | 4756 | 4827 | 4728 | 4869 | 4949 | 4777 | 4832 |
| Tensile Strength at Break | 4443 | 4728 | 4997 | 4601 | 4702 | 4584 | 4779 | 4896 | 4672 | 4755 |
| Flexural Strength, psi | 8721 | 8403 | 9147 | 9754 | 9705 | 9715 | 9911 | 10,227 | 9823 | 10,040 |
| Flexural Modulus × 10$^5$ | 3.30 | 3.98 | 4.01 | 3.82 | 3.81 | 3.74 | 3.86 | 3.86 | 3.71 | 3.79 |

TABLE 4

| Formulation (Parts by Weight) | A | B | C | D | E | F | G | H |
|---|---|---|---|---|---|---|---|---|
| High Impact Polystyrene (Styron 492) | 100 | 80 | 80 | 80 | 80 | 80 | 80 | 80 |
| Antimony Trioxide | — | 5 | 5 | 5 | 5 | 5 | 5 | 3 |
| Diadduct of hexachlorocyclopentadiene and 1,5-cyclooctadiene | — | 15 | — | 10 | 7.5 | 5 | 3 | 4 |
| Decabromodiphenyl oxide | — | — | 15 | 5 | 7.5 | 10 | 12 | 13 |
| Oxygen Index | 17.6 | 24 | 28 | 28 | 26 | 26 | 26 | 28 |
| ASTM D-635 | B | SE | SE | SE | SE | SE | SE | SE |
| UL-94 1/8 inch specimen | NA | V-1 | V-0 | V-0 | V-1 | V-0 | V-0 | V-0 |
| UL-94 1/16 inch specimen | NA | V-2 | V-0 | V-2 | V-0 | V-2 | V-0 | V-2 |
| Izod Impact Strength Foot pounds/inch notch | 1.7 | 0.5 | 1.1 | 0.7 | 1.1 | 1.0 | 1.3 | 1.3 |
| Heat Distortion (264 psi)° C | 75 | 79 | 76 | 79 | 76 | 75 | 75 | 72 |
| (66 psi)° C | 86 | 89 | 85 | 87 | 86 | 87 | 85 | 82 |
| Tensile Strength at Yield | 4425 | — | — | 4960 | — | — | 4963 | — |
| Tensile Strength at Break | 4443 | 4968 | 4997 | 5029 | 4892 | 4975 | 4908 | 4814 |
| Flexural Strength, psi | 8721 | 9235 | 9147 | 8770 | 10,297 | 8721 | 10,391 | 8766 |
| Flexural Modulus × $10^5$ | 3.3 | 4.21 | 4.01 | 4.20 | 3.88 | 3.97 | 3.90 | 3.96 |

From the data in Table 1, it is seen that composition B containing the furan diadduct had an impact strength of 3.3 and the composition C containing the oxide had an impact strength of 2.8, but the compositions containing a mixture of the two additives have impact strengths of 4.0 up to 7.4, compared to 8.6 for the base polymer. The compositions containing a mixture of additives had a fire retardancy rating of V-0 as measured by the Underwriter's Laboratory Test No. 94 as compared to a rating of V-1 and V-2 for the compositions containing the individual additives.

From the data in Table 2, it is seen that composition B containing the diadduct of 1.5-cyclooctadiene had an impact strength of 1.1, but when this additive was blended with the oxide, higher impact strengths were achieved. The fire retardancy as measured by the Underwriter's Laboratory Test-94 was better for the blends compared to the individual additives.

The data in Tables 3 and 4 show that the unexpected improvement in properties that prevailed for the additive blends in ABS in Tables 1 and 2, also prevail for the additive blends of the invention when used in high impact polystyrene.

While the invention has been illustrated with various embodiments, many modifications can be made in the invention without departing from the spirit and scope thereof.

We claim:

1. A fire retardant polymeric composition comprising a high impact thermoplastic polymer and an effective fire retardant proportion of decabromodiphenyl oxide and a diadduct of a halogenated cyclopentadiene and a polyunsaturated cyclic compound.

2. Composition of claim 1 wherein the diadduct has the formula

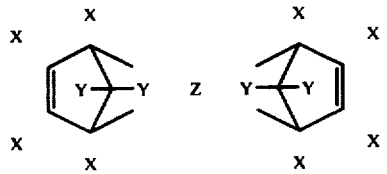

wherein X is selected from chlorine, bromine and fluorine, Y, is selected from chlorine, bromine, fluorine, alkyl of 1 to 10 carbon atoms, alkloxy wherein the alkyl group contains 1 to 10 carbon atoms, haloalkyl and haloalkyloxy wherein the alkyl groups contain 1 to 10 carbon atoms and halo is chloro, bromo or fluoro; Z is a tetravalent cyclic radical having at least 4 carbon atoms which may be substituted by alkyl groups of 1 to 6 carbon atoms, chlorine, bromine or fluorine.

3. The composition of claim 2 wherein the mixture of the oxide and the diadduct is present in a proportion of about 2 to about 50 percent by weight of the polymer composition.

4. The composition of claim 3 wherein the proportion of diadduct is in the range of about 10 to about 90 weight percent of the mixture of diadduct and oxide.

5. The composition of claim 2 wherein Z is a tetravalent cyclic hydrocarbon of 5 to 18 carbon atoms.

6. The composition of claim 2 wherein Z is a tetravalent heterocyclic radical of 4 to 18 carbon atoms.

7. The composition of claim 5 wherein the diadduct is 1,2,3,4,7,8,9,10,13,13,14,14-dodecachloro-1,4,4a,5,6,6a,7,10,10a,11,12,12a-dodecahydro-1,4:7,10,-dimethanodibenzo[a,e]cyclooctene.

8. The composition of claim 6 wherein the diadduct is 1,2,3,4,6,7,8,9,10,10,11,11-dodecachloro-1,4,4a,5,5a,6,9,9a,9b-octahydro-1,4:6,9-dimethanodibenzofuran.

9. The composition of claim 4 wherein the polymer is a graft copolymer of polybutadiene, styrene and acrylonitrile.

10. The composition of claim 4 wherein the polymer is high impact polystyrene.

11. The composition of claim 2 wherein a metallic compound is present in a proportion of about 1 to about 30 percent by weight of the polymer composition.

12. The composition of claim 11 wherein the metallic compound is antimony trioxide.

13. A fire retardant polymeric composition comprising a graft copolymer of polybutadiene, styrene and acrylonitrile or a high impact polystyrene and an effective fire retardant proportion of antimony trioxide, decabromodiphenyl oxide and a diadduct of a halogenated cyclopentadiene and a polyunsaturated cyclic compound.

14. The composition of claim 13 wherein the diadduct is 1,2,3,4,7,8,9,10,13,13,14,14-dodecachloro-1,4,4a,5,6,6a,7,10,10a,11,12,12a-dodecahydro-1,4:7,10,-dimethanodibenzo[a,e]cyclooctene.

15. The composition of claim 13 wherein the diadduct is 1,2,3,4,6,7,8,9,10,10,11,11-dodecachloro-1,4,4a,5,5a,6,9,9a,9b-octahydro-1,4:6,9-dimethanodibenzofuran.

* * * * *

UNITED STATES PATENT AND TRADEMARK OFFICE
CERTIFICATE OF CORRECTION

PATENT NO. : 4,000,114
DATED : December 28, 1976
INVENTOR(S) : Irving Gordon; James J. Duffy; Norman W. Dachs It is certified that error appears in the above-identified patent and that said Letters Patent are hereby corrected as shown below:

At Table 1, Column C, Flexural Strength, psi, for "8859" read "8857".

Signed and Sealed this

Eighth Day of May 1979

[SEAL]

Attest:

RUTH C. MASON
Attesting Officer

DONALD W. BANNER
Commissioner of Patents and Trademarks